W. HARMON.
WELL SCREEN.
APPLICATION FILED AUG. 23, 1909.
963,549.
Patented July 5, 1910.
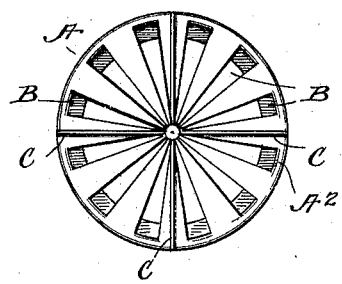
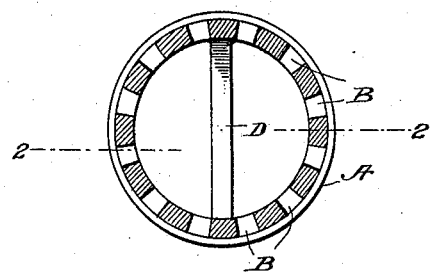
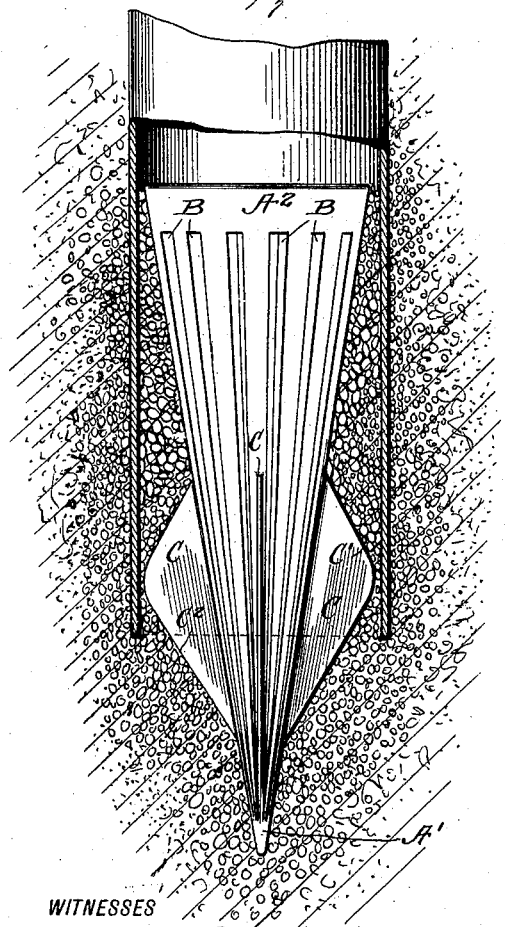
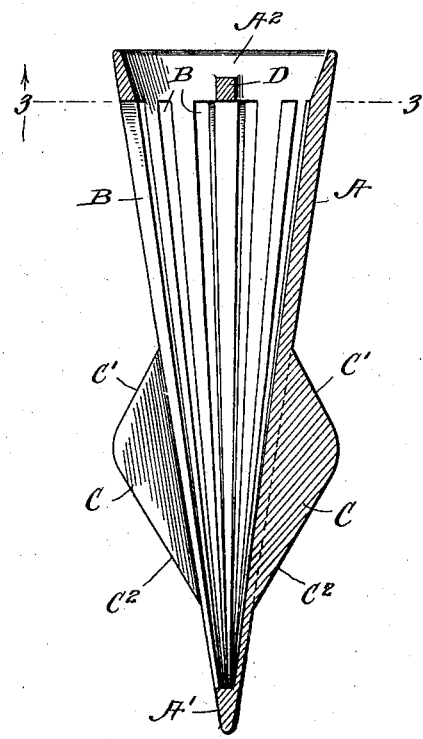
WITNESSES
INVENTOR
WILLIAM HARMON,
BY
ATTORNEYS

UNITED STATES PATENT OFFICE.

WILLIAM HARMON, OF TIFFIN, OHIO.

WELL-SCREEN.

963,549.

Specification of Letters Patent. Patented July 5, 1910.

Application filed August 23, 1909. Serial No. 514,199.

*To all whom it may concern:*

Be it known that I, WILLIAM HARMON, a citizen of the United States, residing at Tiffin, in the county of Seneca and State of Ohio, have invented a new and useful Improvement in Well-Screens, of which the following is a specification.

This invention is an improvement in well screens and consists in certain novel constructions and combinations of parts as will be hereinafter described and claimed.

In the drawing—Figure 1 is a side view of my screen as in use in a well, a part of the well and its casing being shown. Fig. 2 is a vertical longitudinal section of the screen on about line 2—2 of Fig. 3. Fig. 3 is a cross section of the screen on about line 3—3 of Fig. 2 looking in the direction of the arrow in Fig. 2, and Fig. 4 is a bottom view of the screen or point, looking at the lower pointed end thereof.

In carrying out the invention I employ a screen body A, which is conical in form with the apex downward and brought approximately to a point, is hollow and is provided with a series of longitudinal vertical slots B, which permit the passage of water.

Upon the outer side of the screen or point below the ring $A^2$ I provide a number of longitudinally extending lateral lugs or blades C, forming guides to retain the screen in its proper position when being inserted in or removed from a well. As best shown in Figs. 1 and 2 the blades C are formed in planes radial to the axis of the conical body and they are sloped on their upper and lower edges at $C'$ and $C^2$ to facilitate the introduction of the strainer into and its removal from a well.

The screen is preferably cast in one piece ready for use and is provided with a bar D across its upper end which bar may be used as a pump rest as well as for handling the screen in inserting and removing the same.

In the practical use of the invention as illustrated in Fig. 1, the slots B will operate to hold back the stone and coarse gravel which in turn will form a screen and hold back the smaller particles. These in turn also form a screen and hold back still smaller particles and so on. When the screen has been inserted in position in the well all small particles will be pumped off, after which the well will be ready for use.

By the described construction the area of the screen surface is increased to such an extent that the disturbance caused by the suction of the pump will not be sufficient to displace any of the rock or gravel and consequently none of the same will enter the pump.

I claim—

A well point or strainer consisting of a body conical in form and tapering toward its lower pointed end, and provided with longitudinal slots or openings and having a solid point at its lower end and a continuous rim ring at its upper end, a cross bar within the said continuous ring and guide blades or lugs projecting laterally from the body below said top ring substantially as and for the purposes set forth.

WILLIAM HARMON.

Witnesses:
CHARLES E. DERR,
JOHN C. ROYER.